(12) United States Patent
Chen

(10) Patent No.: US 6,533,241 B1
(45) Date of Patent: Mar. 18, 2003

(54) RETAINING PIECE OF A BALL VALVE

(76) Inventor: Pin-Neng Chen, 4F, No. 37, Kung-yuan Rd., Hsinchuang City, Taipei Hsien (TW)

( * ) Notice: Subject to any disclaimer, the term of this patent is extended or adjusted under 35 U.S.C. 154(b) by 0 days.

(21) Appl. No.: 09/969,831

(22) Filed: Oct. 4, 2001

(51) Int. Cl.⁷ .............................................. F16K 25/00
(52) U.S. Cl. ..................................... 251/171; 251/173
(58) Field of Search ................................ 251/170, 174, 251/173, 171

(56) References Cited

U.S. PATENT DOCUMENTS

| | | | | |
|---|---|---|---|---|
| 3,014,690 A | * | 12/1961 | Bodelen | 251/171 |
| 3,834,663 A | * | 9/1974 | Donnelly | 251/173 |
| 4,201,239 A | * | 5/1980 | Kawamura et al. | 251/173 |
| 4,210,313 A | * | 7/1980 | Chester | 251/173 |
| 4,230,139 A | * | 10/1980 | Scaramucci | 251/173 |
| 4,258,901 A | * | 3/1981 | Zinnai et al. | 251/173 |
| 4,318,420 A | * | 3/1982 | Calvert | 251/171 |
| 4,513,946 A | * | 4/1985 | Priese | 251/173 |

FOREIGN PATENT DOCUMENTS

GB      1010118    * 11/1965 ............... 251/173

* cited by examiner

Primary Examiner—Paul J. Hirsch
(74) Attorney, Agent, or Firm—Bacon & Thomas, PLLC

(57) ABSTRACT

A retaining piece of a ball valve is provided with an engaging surface and a groove defined to provide resilience to the engaging surface which engages with an outer surface of a ball. With such an arrangement, the engagement between the outer surface of the ball and the engaging surface is fluid-tight. Furthermore the engaging surface is resilient and is able to deform slightly to suit the surface of the ball even after a long-term use, and therefore prolongs the operation life of the ball valve.

3 Claims, 4 Drawing Sheets

RETAINING PIECE OF A BALL VALVE

BACKGROUND OF THE INVENTION

1. Field of the Invention

The present invention relates to a retaining piece of a ball valve. More particularly to a retaining piece having groove to provide resilience such that a ball of the ball valve is able to be tightly sealed between the retaining pieces so as to prevent leakage of the ball valve.

2. Description of Related Art

In many applications, especially in industrial processes, ball valves are used to control the flow of a fluid through piping. With reference to FIG. 3, a conventional ball valve (50) is shown and has a hollow seat (51) with two side-openings, a ball (52) rotatably received inside the hollow seat (51), and two retaining pieces (53) oppositely disposed to sandwich the ball (52). A spindle (541) is coupled to the ball (52) and extends through a spindle hole (511) defined through a top portion of the hollow seat (51). The spindle (541) is further couple to a handle (54) such that the rotation of the ball (52) received inside the hollow seat (51) is able to be controlled by the handle (54). A passage (521) transversely defined through the ball (52) so that when the ball (52) is rotated to a position such that the passage (521) communicates with the two side-openings, fluid is able to flow through the ball valve from one of the two side-openings to the other side-opening via the passage (521). The flow rate of the fluid is able to be controlled or completely shut down by turning the handle (54) to control the communication of the side-openings and the passage (521). However, leakage of the ball valve typically happens when the engagement between the ball (52) and the retaining piece (53) is not tightly sealed. Especially when after long term use of the ball valve, the inevitable rubbing between the surface of the ball (52) and the surface of the retaining piece (53) gradually causes the ball (52) and the retaining pieces (52) to lose their sealing engagement and therefore resulting in the leakage of the ball valve.

With reference to FIG. 4, an improved retaining piece (63) is invented to overcome the aforementioned leaking problem. The retaining piece (63) is fitted with a metallic ring (631) which is attached to a side of the retaining piece (63) opposite to the side having the ball (52) securely engaged. A space is provided between the retaining piece (63) and the metallic ring (631) to provide resilience. With the metallic ring (631) added, the retaining pieces (63) cushion yet firmly engage the ball (52) therebetween such that even though rubbing between the ball (52) and the retaining pieces (63) is still inevitable, the resilience provided is able to automatically adjust and keep the ball (52) tightly sealed with the retaining pieces (63) to prevent the leakage of the ball valve. Nevertheless, although the retaining piece (63) with the metallic ring (631) tends to solve the leakage problem, a further problem may rise in that adding the retaining piece (63) complicates the structure of the ball valve which in turn increases of the costs associated with the manufacturing of the ball valve.

To overcome the shortcomings, the present invention tends to provide a retaining piece of a ball valve to mitigate or obviate the aforementioned problems.

SUMMARY OF THE INVENTION

The objective of the present invention is to provide a retaining piece of a ball valve. A groove is defined in and around the retaining piece to provide resilience so that the retaining piece is able to tightly engage with a ball of the ball valve, and thereby prevent leakage of the ball valve.

Other objectives, advantages and novel features of the invention will become more apparent from the following detailed description when taken in conjunction with the accompanying drawings.

DETAILED DESCRIPTION OF THE PREFERRED EMBODIMENT

Figure 4:
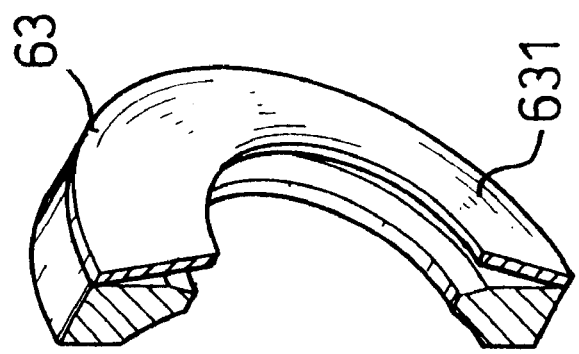
FIG. 4 is a perspective, cross-sectional view of a conventional retaining piece provide with a metallic ring.
Figure 1:
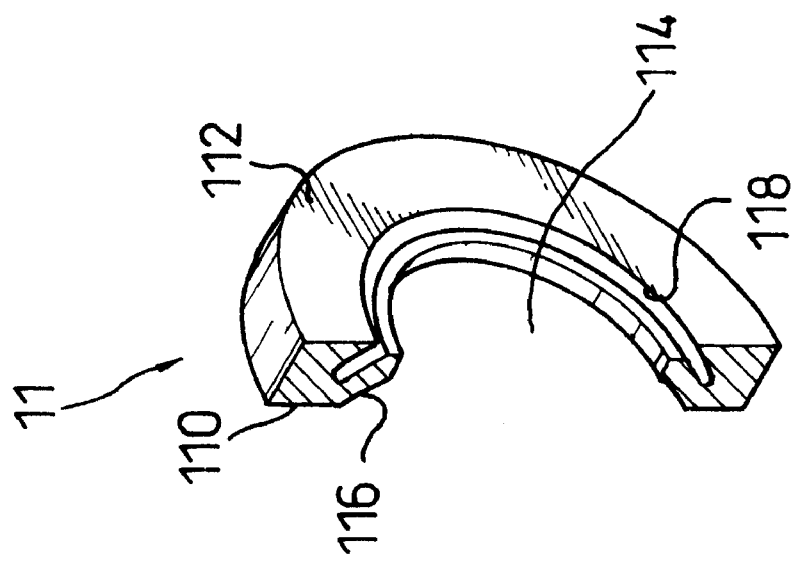
FIG. 1 is a perspective, cross-sectional view of a retaining piece of a ball valve in accordance with the present invention.
Figure 2:
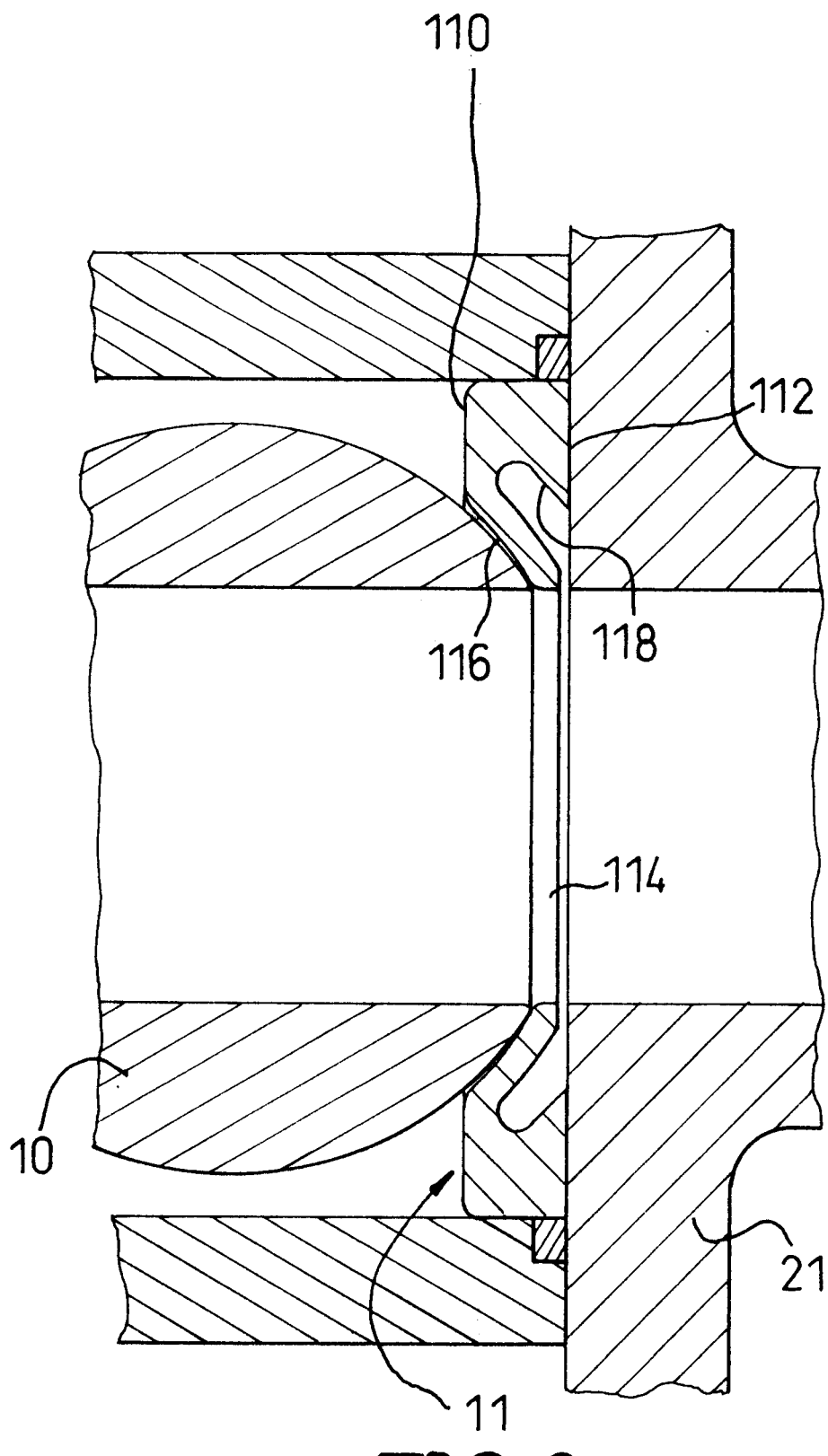
FIG. 2 is a cross-sectional view showing the engagement between the retaining piece and a ball of the ball valve.
Figure 3:
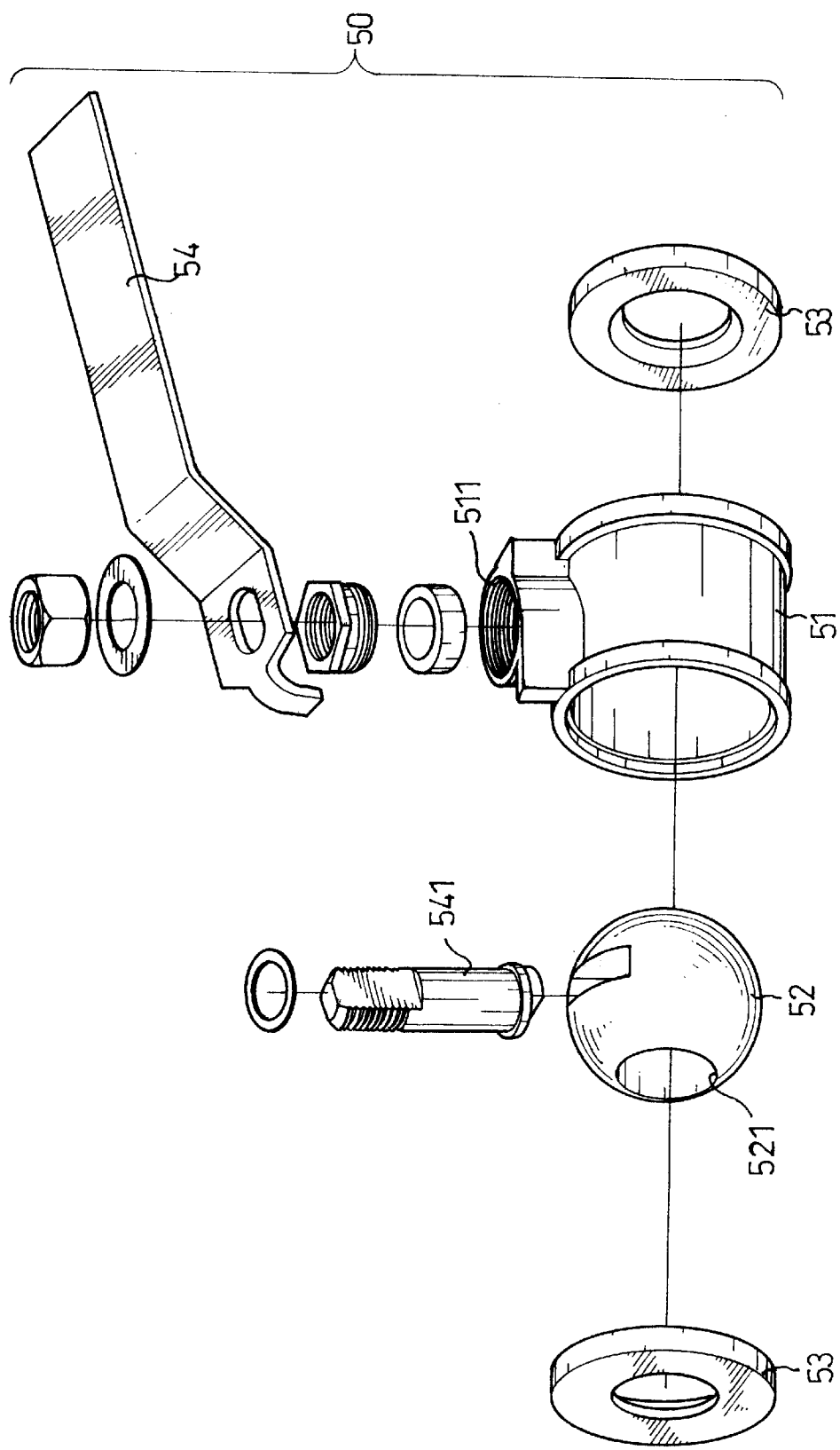
FIG. 3 is an exploded, perspective view of a conventional ball valve.
Figure 5:
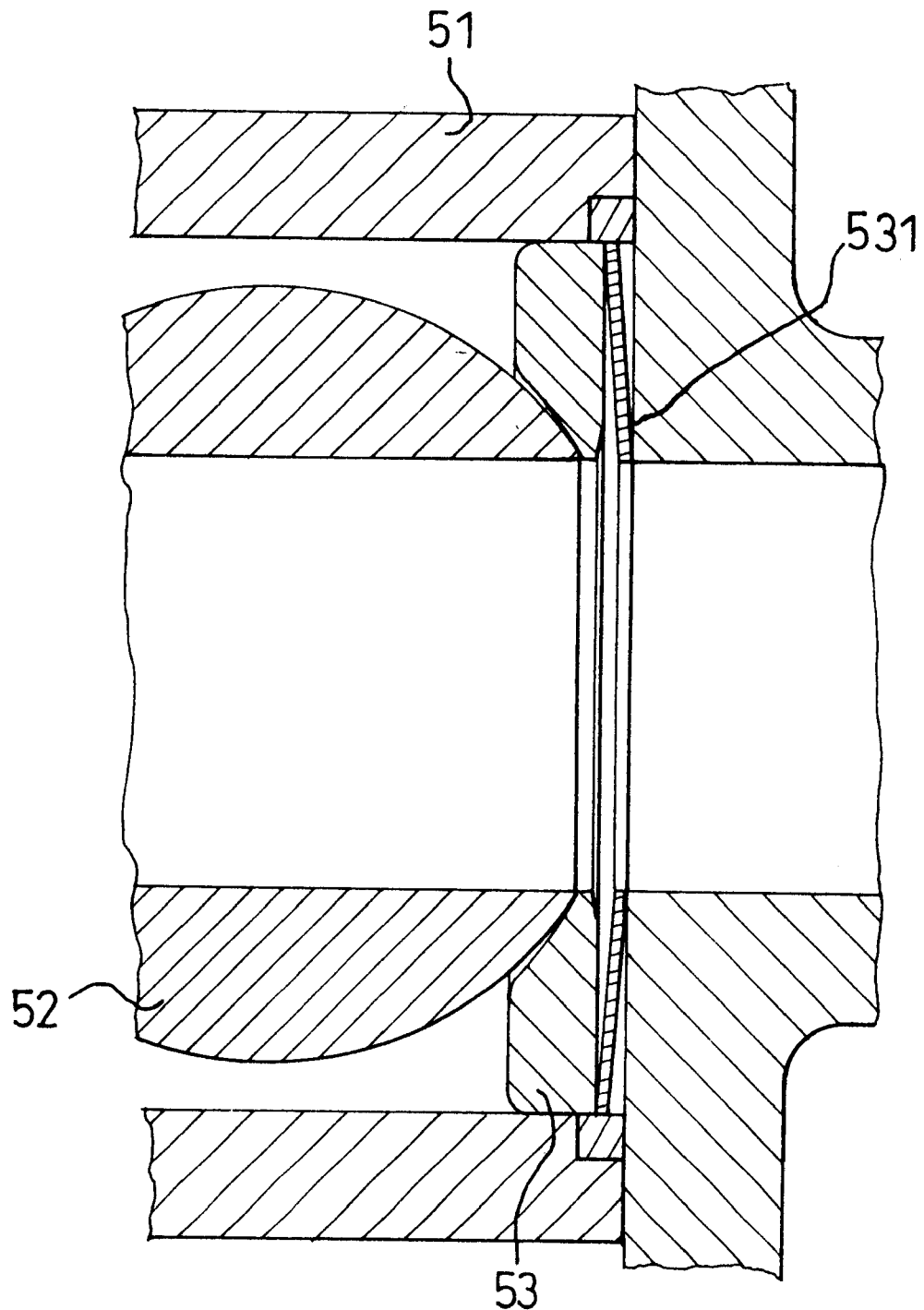
FIG. 5 is a cross-sectional view showing the engagement between the conventional retaining piece shown in FIG. 4 and a ball of the conventional ball valve.

With reference to FIGS. 1 and 2, a retaining piece (11) of a ball valve in accordance with the present invention is shown. The retaining piece (11) configured as a ring and has an inner face (110) and an outer face (112). A through hole (114) defined by an engaging surface (116) is defined through the retaining piece (11) from the inner face (110) to the outer face (112). The engaging surface (116) extends in an inwardly inclined manner toward the outer face (112). The retaining piece (11) has a groove (118) defined around the through hole (114) and between the engaging surface (116) and the outer face (112).

Referring to FIG. 2, two retaining pieces (11) are respectively disposed to opposite sides of a ball (10) of the ball valve. Due to symmetry of the ball valve structure, only half of the ball valve structure is shown. The retaining piece (11) is sandwiched between the ball (10) and a side cover (21) of the ball valve. An outer surface of the ball (10) tightly engages with the engaging surface (116) of the retaining piece (11). Owing to the arrangement of the groove (118), the engaging surface (116) is resilient rather than stiff. Therefore, the engaging surface (116) is able to be deformed slightly to contour with the outer surface of the ball (10). Consequently, the engagement between the outer surface of the ball (10) and the engagement surface (116) is fluid-tight. Even after the engagement surface (116) has been rubbed through long term use, the resilience of the engaging surface (116) is able to deform automatically to suit the ball (10) to prolong the operation life of the ball valve.

From the above description, it is noted that the invention has the following advantages:

1. The retaining piece has an engaging surface (116) to engage with the outer surface of the ball (10). The groove (118) is defined to provide resilience to the engaging surface (116) and thereby enables a firm fluid-tight between the outer surface of the ball (10) and the engaging surface (116).
2. The engaging surface (116) is able to deform to suit the outer surface of the ball (10) and thereby prolongs the operation life of the ball valve even after long term use.
3. The retaining piece (I1) has a simple structure and therefore easy to produce. Furthermore, the retaining piece (11) is formed to have a single piece configuration which enables a convenient assembly of the ball valve compared with the conventional retaining piece (63) having an additional metallic ring (631).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining piece of a ball valve, the retaining piece having an inner face, an outer face, and a through hole extending through the retaining piece from the inner face to the outer face, wherein the improvements comprises:

an engaging surface extending from the inner face to the outer face and defining the through hole to engage with an outer periphery of the ball valve; and a groove defined in the outer face and coaxial to the engaging surface so as to provide resilience to the engaging surface, whereby the engaging surface is able to deform slightly to firmly engage the outer periphery of the ball of the ball valve, and the engagement between the outer periphery of the ball and the engaging surface is fluid-tight.

2. The retaining piece as claimed in claim 1, wherein the engaging surface is inclined inwardly from the inner face to the outer face, whereby the engaging surface is adapted to mate well with the outer periphery of the ball valve.

3. The retaining piece as claimed in claim 2, wherein the groove is adapted to be defined around the through hole.

* * * * *